Jan. 15, 1952  P. L. DONOVAN  2,582,750
MULTIPLE HARROW DRAFT DEVICE
Filed Aug. 18, 1947  3 Sheets-Sheet 1
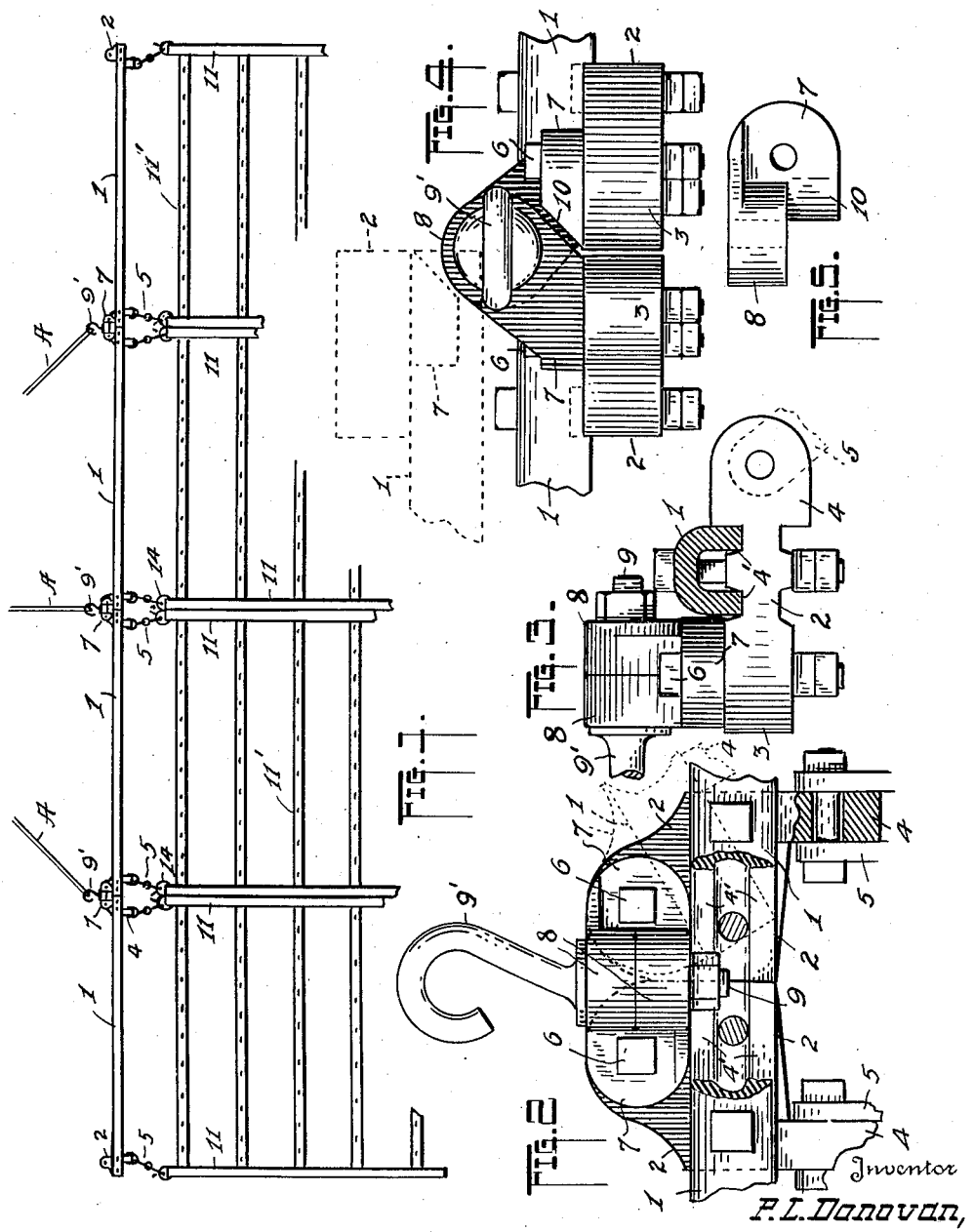

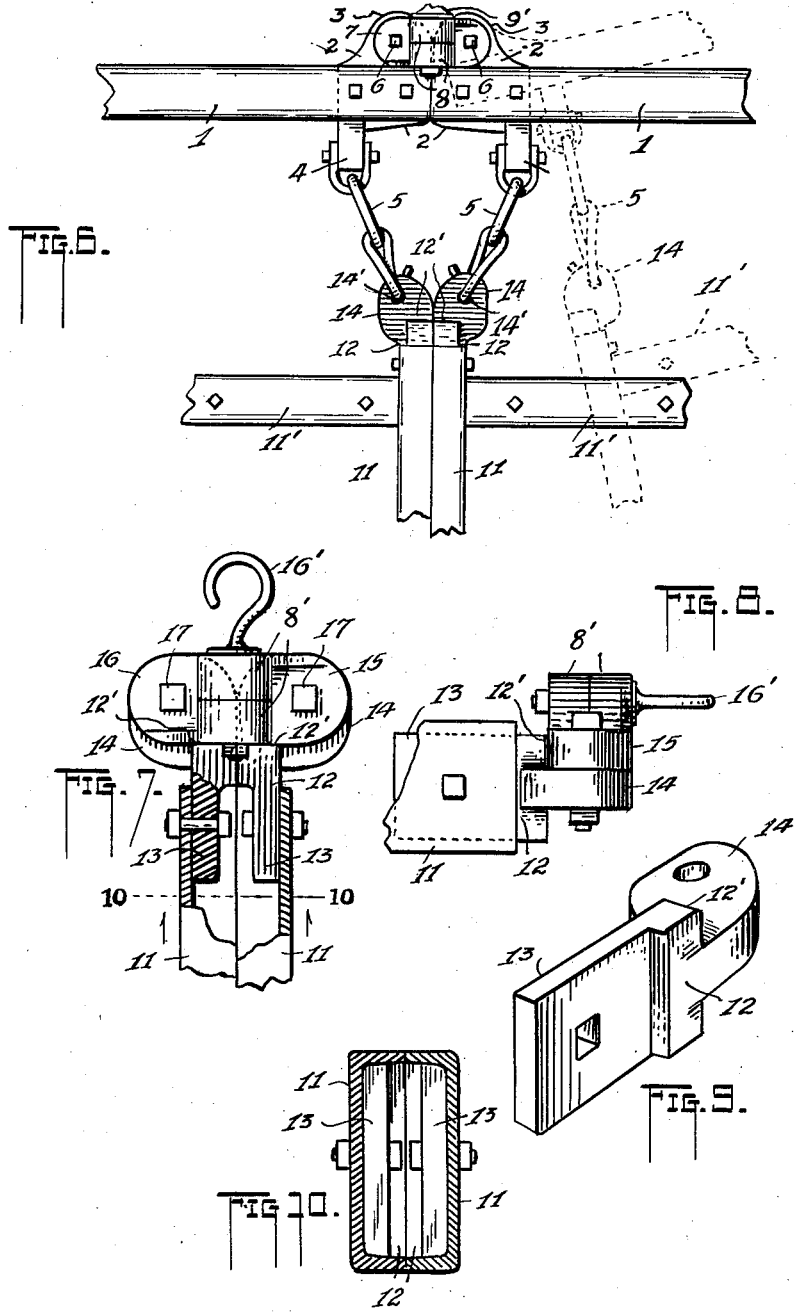

Jan. 15, 1952 P. L. DONOVAN 2,582,750
MULTIPLE HARROW DRAFT DEVICE
Filed Aug. 18, 1947 3 Sheets-Sheet 3

Inventor
P. L. Donovan,
By
Attorney

Patented Jan. 15, 1952

2,582,750

UNITED STATES PATENT OFFICE 2,582,750

MULTIPLE HARROW DRAFT DEVICE

Patrick L. Donovan, Peoria, Ill.; Mary J. Donovan executrix of said Patrick L. Donovan, deceased Application August 18, 1947, Serial No. 769,099

12 Claims. (Cl. 55—84)

This invention relates to harrows of the "drag" type. More particularly said invention has to do with draft attachments for drag harrows, in respect both to the sections of a harrow, and the well known draft bar, at times used to draw harrows.

It is well known that drag harrows usually are often made up of, and comprise several sections lying side by side, which may be attached as a whole directly to the tractor, or other power. It is known, also, that when employing a draft bar, such draft bar is itself attached directly to the power and has the harrow sections connected thereto and drawn thereby, said bar consisting of sections, each section thereof having a length equal to the width of a harrow section drawn by it. With this in mind, an object, herein is to provide a coupling for adjacent ends of the draft bar section as well as a coupling for the adjacent sides of harrow sections at what may be said to be their leading edges, said couplings being so constructed as to permit the free "floating" of the various harrow sections relatively to permit certain of the harrow sections to swing relative to others in the planes thereof, and yet will serve to maintain all of the draft bar sections and all of the sections of the harrow in perfect line, relatively, during harrowing operations.

Another object is to provide identical couplings for the draft bar sections and the harrow sections whereby the operator may readily attach to the power either the draft bar or the harrow as a whole, with the least possible work in making the change.

Still another object is to so construct the couplings that in the event a draft bar is in use in dragging the harrow, and it is desired to discard it and attach said harrow directly to the power, the draft linkage attached to said power may be transferred to the couplings of the harrow sections with a minimum of work and loss of time.

Again, an important object lies in furnishing hinging couplings for the sections of a draft bar, and for the sections of a harrow, such couplings being so constructed that, as to the draft bar itself, the sections thereof may be folded over one upon another for transportation purposes, in addition to which said couplings shall normally hold all of the sections in a straight line relatively during forward travel and yet permit movements thereof with respect to each other when said forward travel may be changed, as in turning about in the field.

That the invention may be fully understood, reference is had to the accompanying drawings forming part hereof.

Figure 1 is a plan of part of a sectional drag harrow together with a draft bar, and shows the couplings of the present invention included therewith.

Figure 2 is an enlarged plan of parts shown in Figure 1, the structure of a coupling and its construction.

Figure 3 is a side elevation of the coupling of Figure 2 in viewing the latter from the left.

Figure 4 is a front elevation of the same coupling of Figures 2 and 3.

Figure 5 is a plan of a part of the coupling shown in the previous figures.

Figure 6 is a plan of parts illustrated in Figure 1 much enlarged.

Figure 7 is a plan in part section of a coupling having the same general construction as in Figure 2.

Figure 8 is a side elevation of the coupling of Figure 7.

Figure 9 shows a part of the coupling of Figure 7 in perspective.

Figure 10 is a transverse elevation of part shown in Figure 7 produced on line 10—10 of that figure.

Figure 11:
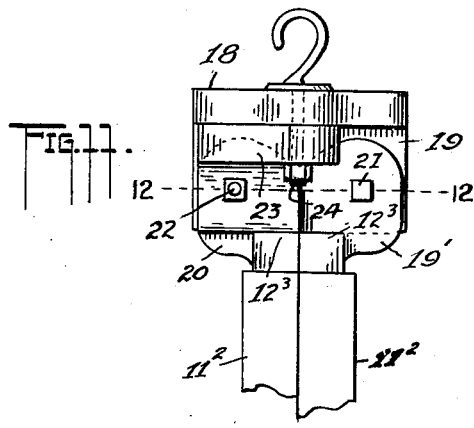
Figure 11 is a plan of a modification of structures shown in the earlier figures.

In the drawing the character 1 denotes a draft bar of several sections abutting at their ends as in Figures 2 and 6. Bolted to each section of said bar near each abutting end, as in said Figure 6, is a coupling part 2 whose forward or leading edge is rounded at 3, the rounded surfaces, as shown in dotted lines in both the figures named, substantially meeting each other in line with the abutting ends of said draft bar sections. At its rear edge part 2 terminates in an extension 4 for receiving a draft linkage 5. Mounted upon each part 2 and held by a bolt 6 is a member 7, these two parts each having an ear 8 upstanding therefrom and one ear abutting the other, a bolt 9 serving as a hinge-pin, and to maintain them in coupled relation. The base of each part 2 is angularly formed as at 10, Figures 4 and 5, in order that the hinged ears 8 may freely swing, as will be understood. The said bolt 9 terminates in a hook 9' for convenience in attaching a draft member A thereto, see Figure 1. The structure described may be said to be a connector for draft bar sections.

It is now noted that, as shown in broken lines in Figure 2, the bolts 6 may serve as pivots about which either of the coupling parts 2 may swing in its own planes with respect to each other, the draft bar section attached thereto swinging therewith. However, such movement can be but a forward one only. That is to say, as shown in Figure 3 the draft bar 1 since bolted to the part 2 is fixed relative thereto, and the members 7 at their rear edges abut the two sections of said bar as may be understood by reference to said Figure 3, as well as Figure 2, and are themselves, in effect, fixed with respect to said bar. And as a guard against shifting of the bar sections even though held by bolts, the said sections may lie in grooves 4' of the part 2 as already shown. Thus sections of the draft bar are held in a perfectly straight line during harrowing operations, and resist a rearward pull thereon.

In addition to this swing of the parts 2, relatively in the forward direction they may turn about the hinging bolt 9 with the draft bar sections so as to be folded one upon the other as suggested in broken lines in Figure 4.

When the draft bar 1 is used for dragging a harrow the named linkage 5 is attached to said harrow, this being shown in Figures 1 and 6.

In the present instance the harrow sections each consists of two side channel members 11 abutting each other but separately swingable in certain operations in the field, as in making turns, for example, as permitted by the coupling parts now to be described, a tooth carrying bar 11' being shown as part of the harrow structure.

In Figure 7 a member 12 having a shank 13 secured to the end of each of a pair of such abutting members 11, the forward ends of said members 12 each terminating in a head 14 each of which has connection thereto of the named linkage 5, Figure 6. These heads 14 are counter-parts of the rounded portions 3 of the parts 2 of Figures 2, 3, 4 previously described, it will be seen. As with the parts 2, the heads 14 are provided with holes 14' for said linkage 5, while being spaced apart the same distance as the holes in said parts 2 that receive the bolts 6. So constructed, it may be understood that, as in Figure 7, the coupling members 15, 16 and hook 16' all correspond in form and size to the members 7 of said Figures 2, 3, 4 and may be mounted and secured by bolts 17 corresponding to said bolts 6 of the earlier figures.

In order that the members 15, 16 may have an abutment corresponding in purpose to that of the draft bar 1, it is noted than an abutment is provided at 12' on each member 12 against which said members 15, 16 may lie. It is thus observed that the harrow sections while provided to be swingable in a forward direction, relatively, are, as with the parts of the draft bar 1, prevented from swinging rearwardly, being maintained in a direct line with each other as viewed in Figure 1. Since the places of separation of the said draft bar sections and the harrow sections coincide, it is clear that the sections of both may be folded as already described, and as suggested in Figure 4.

In respect to Figures 2, 3 and 4 it may be said that since the draft bar sections are mounted on the parts 3, 4 they naturally answer as an abutment means, whereas in respect to the harrow sections the abutment 12' on the parts 12 serve the same end. Although an abutment could be carried by each member 2 to serve the same purpose as in said draft bar the latter since convenient, are in this instance, employed for abutment purposes.

In the field the operator wishing to discard the draft bar 1 and attach the power directly to the harrow section, need merely remove the coupling members 7, from members 2 and transfer them, together with the draft members A, to the coupling member 14 of the harrow, after unhooking the linkage 5 on the latter, the harrowing operation proceeding with but little delay. The change in reverse order is of course, also expedited due to the same structural arrangement.

Figure 12:
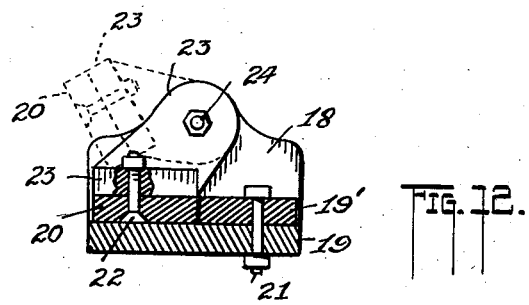
Figure 12 is a rear elevation in part section on line 13—13, Figure 11.
Figure 13:
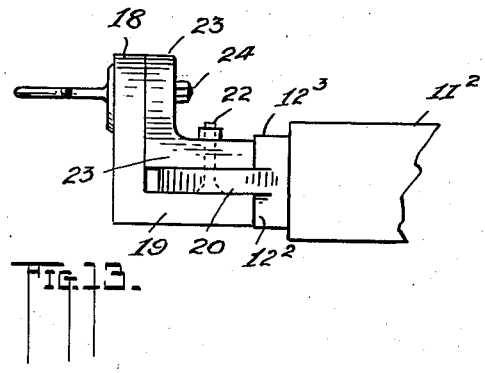
Figure 13 is a side elevation of the same.

Figures 11, 12 and 13 illustrate a modification of parts employed on the harrow structure to serve in the same way as those attached to the draft bar 1 of Figures 7 and 8.

That is to say, in said Figures 11, 12 and 13 an angular, or L-shaped, part or member 18, 19 is provided, for example. Lying upon the portion 19 are parts 19', 20 corresponding to the parts 14 each affixed to a channel member 11² of a harrow section. The part 19' in Figure 12 is connected to the portion 19 by a bolt 21, while the part 20 is connected by a bolt 22 to the member 23, the latter being pivoted to the portion 18 by a bolt 24, Figure 14, by which the harrow is drawn. In Figures 12 and 13 it is thus seen that the member 23 together with the part 20 may pivot on the bolt 24 with respect to the member 18, 19 in the rising and falling movement of sections of which they are parts. As with the connector for the draftbar sections, this structure may likewise be termed a connector in respect to the harrow sections. It is to be emphasized that the connectors for the draftbar sections have the particular duty of maintaining rigid relation of said sections to prevent them swinging rearwardly with respect to each other but permitting them to swing independently of each other in a forward direction at such times that the direction of advance movement is changed from a straight course, while always being free to be folded upon one another, the latter action being true, of course as to the harrow sections. In the early figures of the drawing the planes of pivotal movement of the parts 8' are vertical planes at right angles to the line of advance, while the plane of hinging action forwardly of the draftbar section is a horizontal plane. In addition, the abutting of the parts 3, Figure 4, and the abutting of 19', 20 of Figure 12 prevent upward arching of the draft bars and harrow sections, respectively, the entire structure of both when at work being thus held firmly downward.

The structure throughout provides for a very convenient and, withal, an efficient arrangement in harrows. The members 7 of the draft bar 1 by their ears 8 provide a hinged connection in which there is no looseness, and these abut the said bar, the sections of which are themselves fixed on the members 2, and serve to maintain the sections of the latter in alignment under heavy draft conditions, while permitting said sections to fold as required to let the structure pass through narrow gateways, for example. This is likewise true of the structure at the harrow itself provided by the members 14 and the abutments 12' thereof in respect to the members 15, 16, and equally true of the members 19', 20 and the parts 18, 19 and 23 of Figures 11, 12 and 13. Yet in every instance the sections of the draft bar 1 and the sections of the harrow are free to swing relatively in the direction of travel as turns are made in the field.

I claim:

1. A structure for use in a harrowing equipment including a sectional draftbar whose sections are adapted to swing relative to each other in the direction of advance, a pair of pivotally connected members adapted to swing relatively in a given plane, and each pivotally connected to a separate draftbar section of two sections adjacent each other, a pair of parts normally abutting each other, each independently and pivotally connected with one of the named members and each adapted to swing from its abutting relation in a plane at right angles to the plane of swinging movement of said members, said plane of movement of the latter lying at right angles to the direction of travel of the equipment.

2. In combination, a harrow draftbar of separate sections normally abutting each other at their ends, the whole normally lying in a straight line, said sections adapted to swing relative to each other in a forward direction, a pair of pivotally connected members adapted to swing relative to each other in a plane paralleling the longest measurement of the draft bar, and each said member having pivotal connection with a section of said draftbar near the place of abutment of two of the latter, the position of pivotal connection thereof with a section being spaced laterally from the place of abutment and at the same side of both sections, the axis of pivotal connection of said members with each other lying at right angles to the connection of the same with said sections, and said sections adapted to separate from each other pivotally in but one direction.

3. In a draft attachment for harrow structure, the combination of a pair of members normally lying in close substantially abutting relation, a part fixed relative to and extending from each member, a structure comprising two pivotally related portions adapted to swing in a given plane with respect to each other, and each pivotally connected to one of the first named members, each swingable in a plane perpendicular to the plane of its swinging movement with respect to one of the said first named members in which it is pivoted.

4. The structure defined in claim 3 wherein the places of connection of all of the pivots of the related elements are spaced in a lateral direction from a straight line position of said parts that are fixed to the first named members.

5. An outfit for harrowing including in its construction a structure of two sections, said sections substantially abutting each other, a member affixed to each section adjacent the place of such abutment, the two members thus provided being independent of each other, a pair of pivotally connected parts, the parts being each separately mounted and having one of the named members pivoted thereto, the axis about which the pivotally connected parts swing paralleling and coinciding with the place of abutment of the named sections, and an abutment portion fixed relative to one of the said named members and having a surface lying substantially perpendicular to the named axis of the swingable parts to receive said swingable parts thereagainst.

6. An outfit for harrowing including in its construction a pair of harrow sections adapted to substantially abut each other, a member affixed to a part of each section near the place of abutment of the same, and each terminating in an extension forward of such place of abutment, a pair of pivotally connected parts, the axis of their pivotal movement paralleling and coinciding with the place of abutment of the harrow sections, the parts of said pair of parts being separately connected with one of the named members, the two latter adapted to swing relative to the said parts, and an abutment portion carried by each named member each adapted to receive against it one of the named parts.

7. An outfit for harrowing including in its construction and in combination with a pair of harrow sections, a pair of pivotally connected members adapted to swing relative to each other in parallel planes, a member fixed to a part of each harrow section and each pivotally and separately connected to one of the first named members to swing therewith and arranged to swing relative to the same in planes perpendicular to the plane of pivoted movement of said first named members, and an abutment on one of the second named members, one of the first named members adapted to bear against said abutment.

8. An outfit for harrowing including in its construction, and in combination with a pair of harrow sections, a pair of pivotally connected members adapted to swing relative to each other in parallel planes, a member fixed to a part of each harrow section and each pivotally and separately connected to one of the first named members to swing therewith and arranged to swing relative to the same in planes perpendicular to the plane of pivotal movement of said first named members, and an abutment on each of the second named members, one of the first named members adapted to bear thereagainst.

9. A structure for use in harrowing operations including a pair of associated harrow sections adjacent edges of which parallel the direction of travel, a part fixed relative to each said section normally abutting each other during travel, and a pair of pivotally connected members adapted to swing relative to each other in a vertical plane lying at right angles to the said direction of travel, each member of the pair of members being pivotally connected to one of the named parts fixed on the harrow sections, the pivoting point of the members on each other coinciding in position with the line of abutment of the fixed parts.

10. A structure for use in harrowing operations including a pair of associated harrow sections normally lying adjacent each other on a line paralleling the line of travel and laterally swingable from said line and each including a forwardly projecting extension, one abutting the other, a pair of members each adapted to swing in a vertical plane, and pivotally connected, said plane of swing thereof lying at right angles to the said line of travel, each member being pivotally connected with a said forwardly projecting extension permitting a harrow section to swing on each in changes of direction of travel from said line of travel.

11. A structure as part of a harrowing equipment including a pair of draftbar sections, lying in line with each other in position to abut at their ends, a member fixed with respect to each section and extending forward therefrom in the direction of advance of the equipment, a part pivotally connected with each of the members, the two parts thus provided being themselves connected, said members being swingable on said parts, the planes of swinging movement of the said members on said parts during normal operation of the equipment lying in a line at right angles to the said direction of advance and paralleling the ground surface traversed, the two named parts adapted to swing relative to each other in planes perpendicular to the said direction of advance and paralleling the longest measurement of the aligned draftbar sections.

12. A structure as part of a harrowing equipment including a pair of draftbar sections lying in line with each other in position to abut at their ends, a member fixed with respect to each section and extending forward therefrom in the direction of advance of the equipment, a part pivotally connected with each of the members, a draft device connecting the two parts named and forming a pivot on which they may swing, said members being swingable on said parts, the planes of swinging movement of the said members on the parts during the normal operation of the equipment lying in a line at right angles to the said direction of advance and paralleling the ground surface traversed, the two named parts adapted to swing relative to each other in planes perpendicular to said direction of advance and paralleling the longest measurement of the aligned draftbar sections.

PATRICK L. DONOVAN.

REFERENCES CITED

The following references are of record in the file of this patent:

UNITED STATES PATENTS

| Number | Name | Date |
| --- | --- | --- |
| 942,532 | Anderson | Dec. 7, 1909 |
| 2,284,408 | Endres | May 26, 1942 |